United States Patent
Korlapati et al.

(10) Patent No.: US 9,244,957 B1
(45) Date of Patent: Jan. 26, 2016

(54) HISTOGRAM INTERVAL SELECTION

(71) Applicants: Rama Krishna Korlapati, El Segundo, CA (US); Sung Jin Kim, Buena Park, CA (US); Tri Minh Tran, Los Alamitos, CA (US)

(72) Inventors: Rama Krishna Korlapati, El Segundo, CA (US); Sung Jin Kim, Buena Park, CA (US); Tri Minh Tran, Los Alamitos, CA (US)

(73) Assignee: Teradata US, Inc., Dayton, OH (US)

( * ) Notice: Subject to any disclaimer, the term of this patent is extended or adjusted under 35 U.S.C. 154(b) by 275 days.

(21) Appl. No.: 13/731,614

(22) Filed: Dec. 31, 2012

(51) Int. Cl.
*G06F 17/30* (2006.01)

(52) U.S. Cl.
CPC .............................. *G06F 17/30303* (2013.01)

(58) Field of Classification Search
None
See application file for complete search history.

(56) References Cited

U.S. PATENT DOCUMENTS 5,870,752 A * 2/1999 Gibbons et al.
6,460,045 B1 * 10/2002 Aboulnaga et al.

OTHER PUBLICATIONS

Author: H.V. Jagadish, Hui Jin, Beng Chin Ooi, Kian-Lee Tan; Title: "Global Optimization of Histograms"; Date: May 2001; Publisher: ACM; Pertinent Pages: 12 pages (whole attached document).*

* cited by examiner

*Primary Examiner* — Anh Tai Tran
(74) *Attorney, Agent, or Firm* — Randy L. Campbell, Jr.

(57) ABSTRACT

A database system may include an array of storage devices configured to store a plurality of database tables and a plurality of histograms. Each histogram may correspond to one or more columns of a database table. The database system may further include a processor in communication with the storage device. The processor may receive an indication that a histogram is to be rebuilt, wherein the histogram has a first number of intervals. The processor may determine at least one condition associated with a distribution of column values of at least one column in the histogram. The processor may determine a second number of histogram intervals based on the at least one condition. The processor may rebuild the histogram to include the second number of intervals. A method and computer-readable medium may also be implemented.

20 Claims, 5 Drawing Sheets

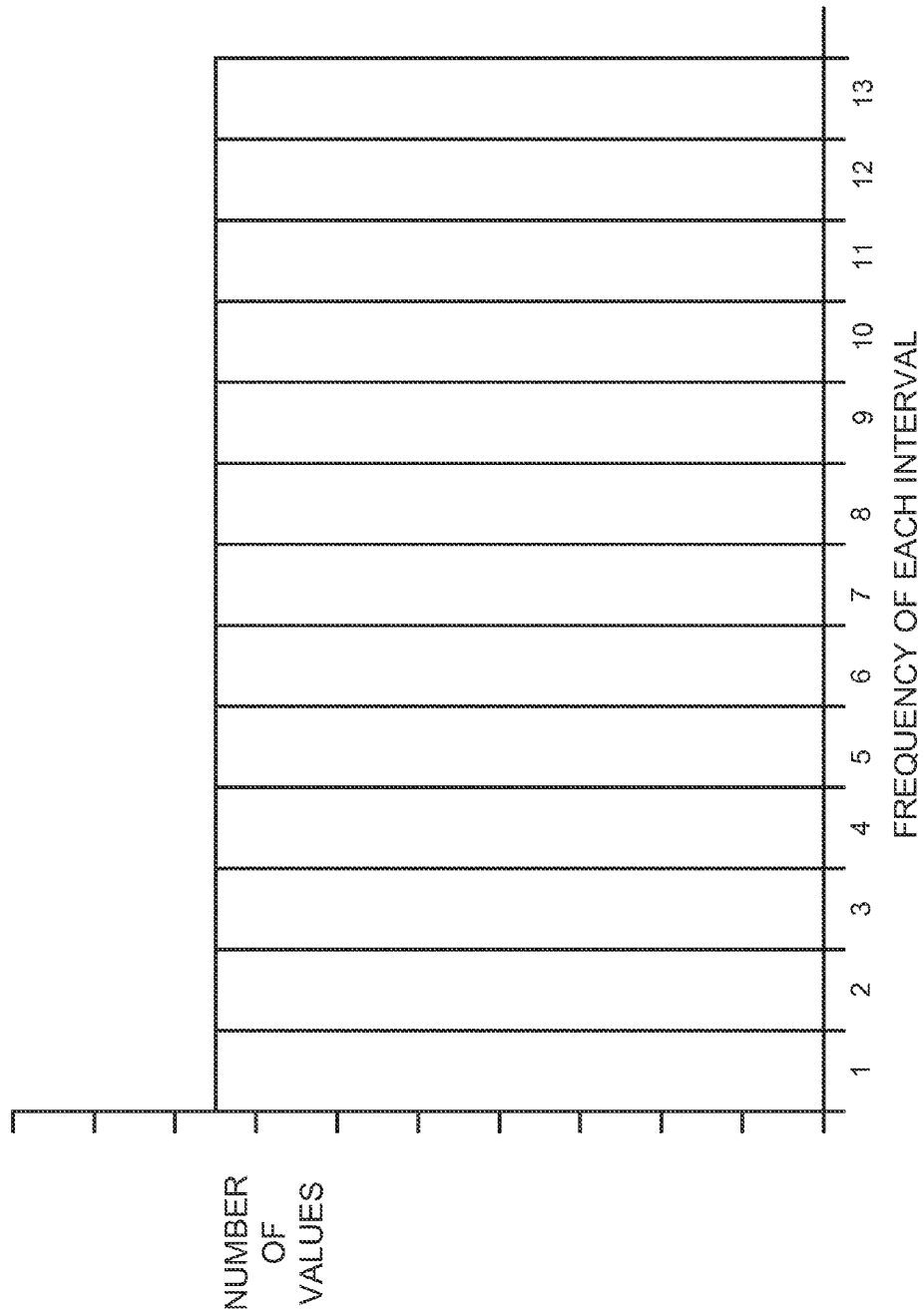

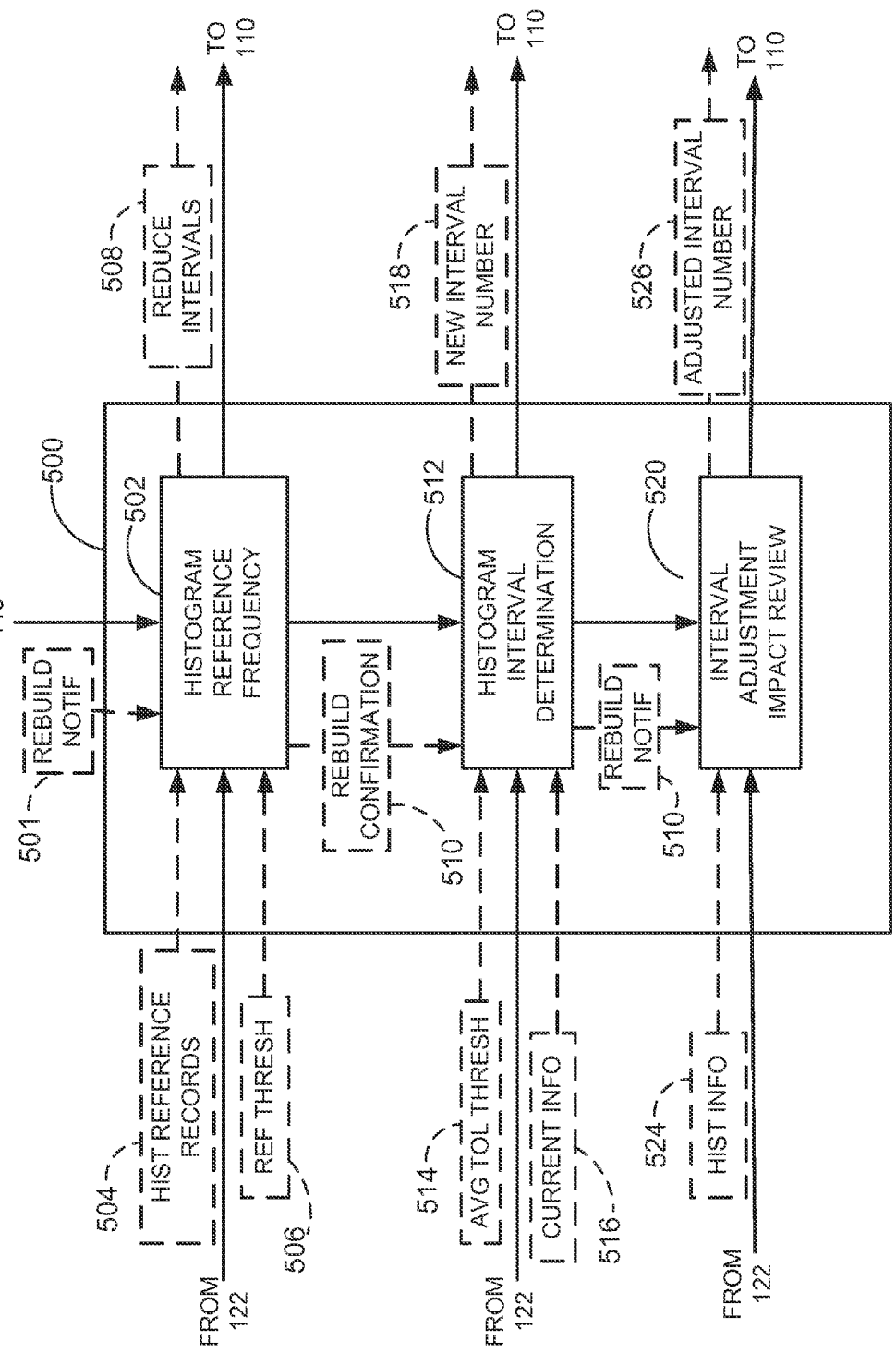

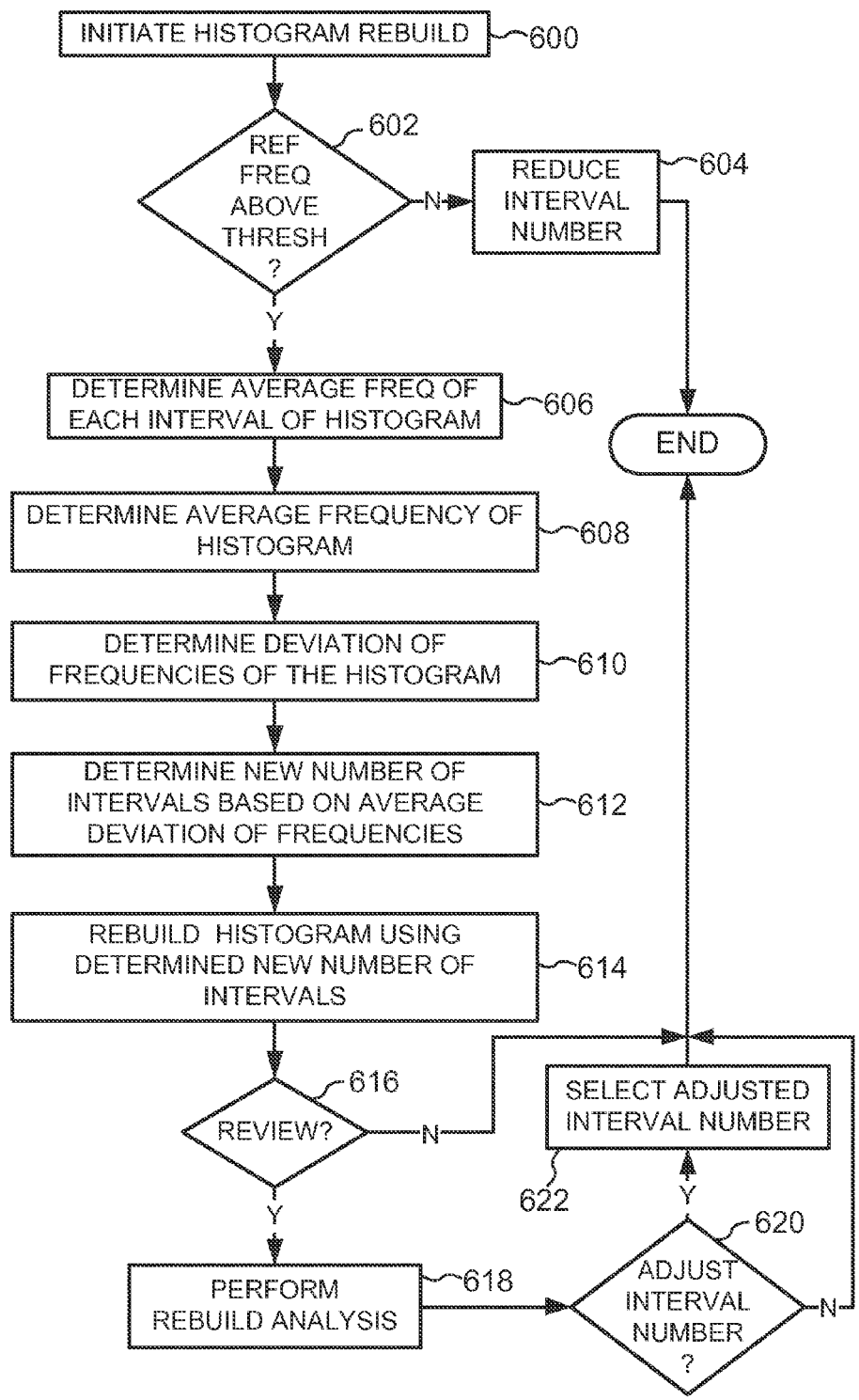

HISTOGRAM INTERVAL SELECTION

BACKGROUND

1. Technical Field

The present disclosure relates generally to histograms in a database system query processing, and more particularly to, rebuilding histograms based on histogram content.

2. Related Art

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

In identifying an optimal plan for responding to a database query, the information of value frequencies for a column greatly helps in choosing the optimal plan for the queries referring to the column. However, it requires prohibitively large amount of space to keep the frequencies of all values on the column. Most database systems support histograms on one or more columns, which is a set of intervals that group adjacent column values together. Each interval of a histogram consists of the minimum value, the maximum value and an average frequency. Instead of using actual frequencies of the values in an interval, a database system typically uses the average frequency for its query planning. The average frequency of an interval works fine when the value frequencies are similar one another. But, when significantly different frequencies are grouped into the same interval, the average frequency could mislead the database system to pick a non-optimal plan. In general, as a histogram has more number of intervals, there is less chance that the values whose frequencies are different significantly are grouped into the same interval, but the histogram may requires more space and time to store/maintain/use.

SUMMARY

In one aspect of the present disclosure, a database system may include an array of storage devices configured to store a plurality of database tables and a plurality of histograms. Each histogram may correspond to at least one column of a database table. The database system may further include a processor in communication with the storage device. The processor may receive an indication that a histogram is to be rebuilt, wherein the histogram has a first number of intervals. The processor may determine at least one condition associated with a distribution of column values of at least one column in the histogram. The processor may determine a second number of histogram intervals based on the at least one condition. The processor may rebuild the histogram to include the second number of intervals.

According to another aspect of the present disclosure, a method may include determining to rebuild a histogram on at least one column of a database table. The histogram may have a first number of intervals. The method may further include determining at least one condition associated with a distribution of column values of the at least one column in the histogram. The method may further include determining a second number of intervals based on the at least one condition. The method may further include rebuilding the histogram using the second number of intervals.

According to another aspect of the present disclosure, a computer readable medium encoded with plurality of instructions executable by a processor. The plurality of instructions may include instructions to rebuild a histogram associated with at least one column of a database table. The histogram may have a first number of histogram intervals. The plurality of instructions may further include instructions to determine at least one condition associated with a distribution of column values of at least one column in the histogram. The plurality of instructions may further include instructions to determine a second number of histogram intervals based on the at least one condition. The plurality of instructions may further include instructions to rebuild the histogram using the second number of histogram intervals.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4 is an example of a histogram.

FIG. 5 is a block diagram of an example portion of the database system of FIG. 1 used to determine histogram rebuild conditions.

FIG. 6 is an operational flow diagram of an example database system implementing histogram rebuilding techniques.

DETAILED DESCRIPTION OF THE FIGURES

Figure 1:
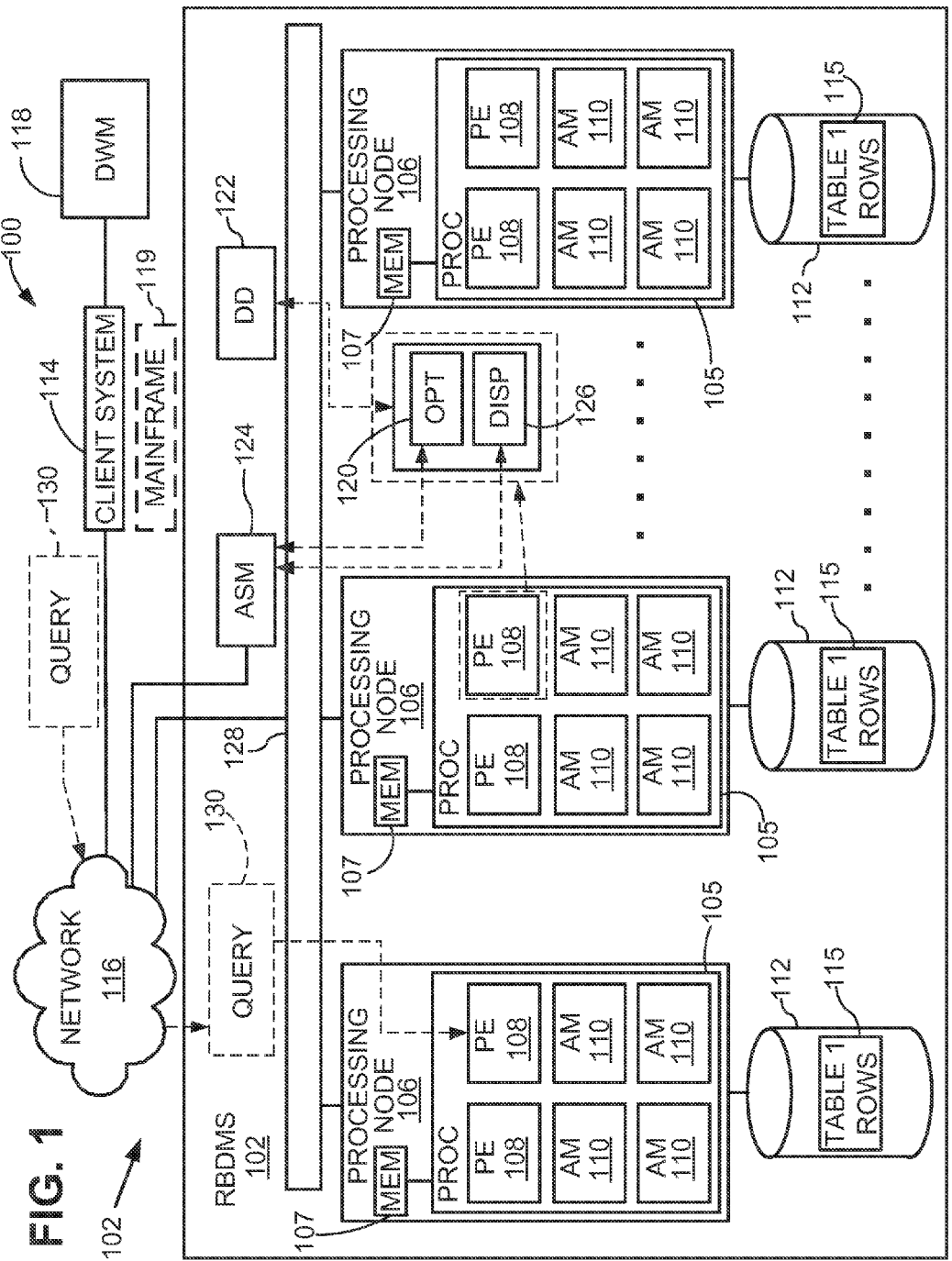
FIG. 1 is a block diagram of an example database system.

FIG. 1 is a diagrammatic representation of example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RBDMS 102 may be a massive parallel processing (MPP) system having an array of processing units and distributed memory. In alternative examples, the RBDMS 102 may implement a single processing unit, such as in a symmetric multiprocessing (SMP) system configuration. The RBDMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing unit arrays such as parsing engine (PE) modules 108 and access modules (AM) 110. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors. The access modules 110 may be access modules processors (AMPs), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 107 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RBDMS 102 stores data in one or more tables in the DSFs 112. In one example, rows 115 of a table, "Table 1," are distributed across the DSFs 112 and in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to DSFs 112 and associated access modules 110 by a hash bucket map. The characteristics of the columns chosen for the primary index determine how evenly the rows are distributed.

Rows of each stored table may be stored across multiple DSFs 112. Each parsing engine module 108 may organize the storage of data and the distribution of table rows. The parsing engine modules 108 may also coordinate the retrieval of data from the DSFs 112 in response to queries received, such as those received from a client computer system 114 connected to the RBDMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RBDMS 102.

Each parsing engine module 108, upon receiving an incoming database query, such as the query 130, may apply an optimizer module 120 to assess the best plan for execution of the query. An example of an optimizer module 120 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 2), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RBDMS 102 as well as fields of each database, for example. Further, the data dictionary module 122 may specify the type, length, and/or other various characteristics of the stored tables. The RBDMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary may be stored in the DSFs 112 or some other storage device and selectively accessed.

The RBDMS 102 may include an active system management (ASM) module 124. The ASM module 124 may be implemented as a "closed-loop" system management (CLSM) architecture capable of satisfying a set of workload-specific goals. In other words, the RBDMS 102 is a goal-oriented workload management system capable of supporting complex workloads and capable of self-adjusting to various types of workloads. The ASM module 124 may communicate with each optimizer module 120, as shown in FIG. 1, and is adapted to convey a confidence threshold parameter and associated parameters to the optimizer module 120 in communication. Further, the ASM module 124 may communicate with a dispatcher module 126 of each parsing engine module 108 (as shown in detail FIG. 1 for parsing engine module 108) to receive query execution plan costs therefrom, and to facilitate query exception monitoring and automated modifications of confidence threshold parameters in accordance with disclosed embodiments. Further, the DWM client 118 may communicate with the ASM module 124 via the network 116.

The ASM module 124 operation has four major phases: 1) assigning a set of incoming request characteristics to workload groups, assigning the workload groups to priority classes, and assigning goals (referred to as Service Level Goals or SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance. In accordance with disclosed embodiments, the ASM module 124 is adapted to facilitate control of the optimizer module 120 pursuit of robustness with regard to workloads or queries.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g., processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally or alternatively, more than one channel may also allow distributed communication to reduce the possibility of an undesired level of communication congestion among processing nodes 106.

Figure 2:
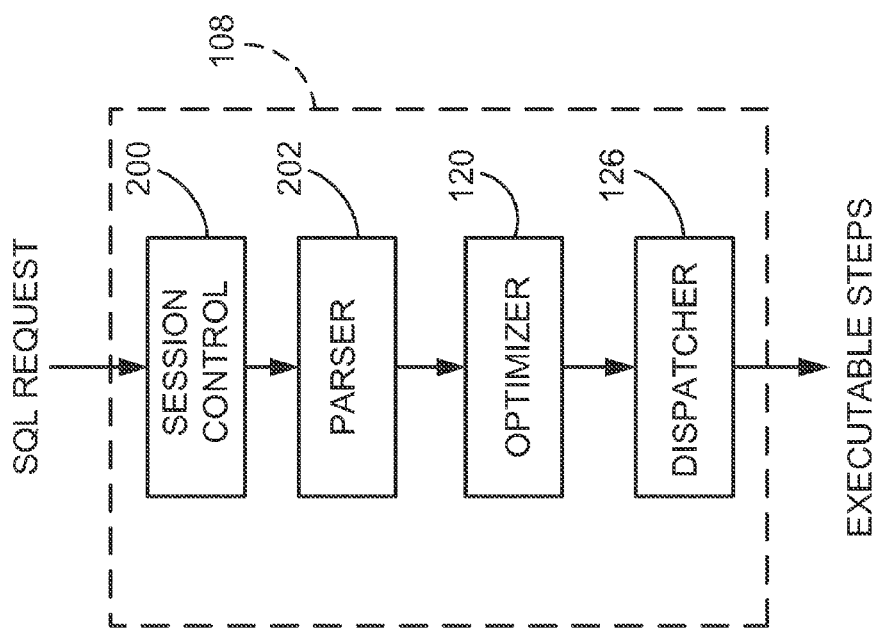
FIG. 2 is a block diagram of a portion of the example database system of FIG. 1.

In one example system, each parsing engine module 108 includes three primary components: a session control module 200, a parser module 202, and a dispatcher module 126 as shown in FIG. 2. The session control module 200 provides the logon and logoff functions. It accepts a request for authorization to access the database, verifies it, and then either allows or disallows the access. Once the session control module 200 allows a session to begin, an SQL request may be received such as through submission by a user and the SQL request is routed to the parser module 202.

Figure 3:
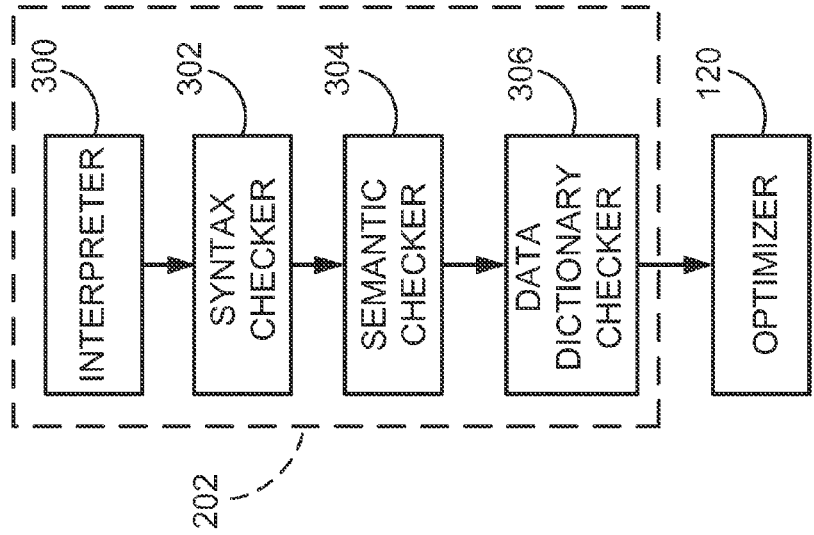
FIG. 3 is a block diagram of another portion of the example database system of FIG. 1.

As illustrated in FIG. 3, the parser module 202 may include an interpreter module 300 that interprets the SQL request. The parser module 202 may also include a syntax checker module 302 that checks the request for correct SQL syntax, as well as a semantic checker module 304 that evaluates the request semantically. The parser module 202 may additionally include a data dictionary checker 306 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

In one example, to facilitate implementations of automated adaptive query execution strategies, such as the examples described herein, the ASM 124 is configured to monitor runtime exception criteria. The ASM 124 monitoring takes place by communicating with the dispatcher module 126 as it checks the query execution step responses from the access modules 110. The step responses include the actual cost information, which the dispatcher module 126 may then communicate to the ASM 124 which, in turn, compares the actual cost information with the estimated costs of the optimizer module 120.

During operation, histograms may be used by the optimizer 120 when selecting a query plan. Histograms may include data associated with the frequency of values in a particular table of interest. Each histogram may provide frequency data on one or more columns of a table. In one example, a histogram may include a plurality of intervals. Each interval may represent the total number of one or more particular values in a column of a database table. Histogram information may be gathered prior to generation of the histogram. In one example, prior to partitioning column values, all unique column values and their frequencies are determined. Thus, at the time of histogram generation, the greatest column value, smallest column value, and total value frequency are all known. Histograms may be generated according to various partitioning strategies. For example, equal-width partitioning may attempt to generate intervals of equal size. In another example, equal-height partitioning may attempt to equalize the frequencies of column values among the intervals. Each strategy may implement sub-strategies such as isolating highly frequent values whose frequency sums are closed to equal-height partitioning. FIG. 4 is an example of a histogram implementing equal-height partitioning. The vertical axis represents the actual frequency of one or more values from a column of a database table. The horizontal axis represents the number of intervals.

During query plan selection, the optimizer module 120 may use the histogram information to determine the average frequency of each interval and use this metric for query planning. The average frequency of each interval is most useful when the average frequency of an interval is close to the actual frequency of each value in the corresponding interval. However, when there is a vast difference between the frequencies of values contained in a single interval, the average frequency will fail to accurately reflect this difference. Thus, any plan selected by the optimizer module 120 under such conditions may be less effective than expected. As the number of intervals is increased in a histogram, this issue decreases in likelihood of occurrence.

As data is added, deleted, and or otherwise changed in a database table, histograms may need to be rebuilt. In rebuilding the histograms, the number of intervals may be re-determined. As the number of intervals is increased, the likelihood of the average frequency of an interval deviating from the actual frequencies of the values contained in the interval decreases. In one example, each time a histogram is rebuilt, the number of intervals may be determined based on one or more factors. One factor may include the frequency with which histograms are referenced. The database system 100 records how often histograms are referenced by the database system 100 for given workloads. Such information may be stored in memory/storage of the database system 100. If a histogram is rarely referenced, the histogram may be regarded as insignificant. In one example, the number of times a histogram has been referenced over a predetermined period of time may be compared to a predetermined reference threshold value. If the threshold has not been met over the predetermined period of time, the number of intervals in the histogram under analysis may be reduced, such as by one half, for example. In other examples, different reduction rates may be used or the number of intervals may remain unchanged. In one example, the data dictionary 122 may maintain a flag indicative of if a histogram has been referenced more than predetermined threshold (TRUE) or not (FALSE).

Another factor that may determine the number of the intervals is the average of deviation of intervals, or "average of deviations." A deviation of frequencies for a particular interval may be a value indicating how different frequencies are grouped within the interval. If frequencies of values in an interval are similar to one another, the deviation is close to zero. In one example, the deviation of frequencies may be found for each interval in a histogram. In one example, the deviation of frequencies for an interval may be found by:

$$\text{Dev of Freq for an Interval} = \text{MAX}(\text{HighestFreq}-\text{Avg-Freq}, \text{AvgFreq}-\text{LowestFreq})/\text{AvgFreq} \qquad \text{Eqn. 1}$$

where HighestFreq, AvgFreq, and LowestFreq represent the highest frequency, average frequency, and the lowest frequency of the interval, respectively. The function MAX( ) finds the maximum value of the input parameters. Upon determination of the deviation of frequencies for each of the intervals, an average deviation of all intervals for the histogram may be determined. The average of deviations a histogram may indicate an overall quality of the average frequencies of all intervals of the histogram. In one example, the average of deviations may become smaller as the histogram is rebuilt with more intervals than previously used. If the average of deviations is greater than an acceptable threshold, increasing the number of intervals may reduce the average of deviations to an acceptable level. In one example, the number of intervals required to meet the acceptable threshold may be found through:

$$\text{New \# of Intervals} = \text{Average Deviation of Freq}/\text{Tolerable Average Deviation}(\text{Initial \# of Intervals}) \qquad \text{Eqn. 2}$$

Where the "New # of Intervals" is the number of intervals to be used in rebuilding the histogram and the "Initial # of Intervals" is the number currently used in the histogram to be rebuilt. The "Tolerable Average Deviation" is a predetermined threshold value for the average deviation of frequencies.

Situations may arise where increasing the number of intervals fails to provide a level of desired impact on reduction of the average deviation of frequencies. Because increasing the number of intervals results in more resources being used with regard to both processing time and data storage, increasing the number of intervals without a significant reduction in the average deviation of frequencies is undesired. Thus, in one example, the effect of adjusting the number of intervals through Eqn. 2 may be subsequently analyzed in order to determine the level of impact any change in the number of intervals has made on the average of deviations of the histogram. An average of deviations value may be stored for each time the histogram is rebuilt. A set of stored average of deviation values may be compared to one another or compared to a predetermined threshold value over a predetermined number of past histogram rebuilds after the most recent of the predetermined number of past histograms has occurred. In one example, the stored average of deviations values from a predetermined number of most-recently performed histogram rebuilds may be compared to one another over a predetermined number of histogram rebuilds. The difference between the highest and lowest average of deviations values of this set may be compared to a predetermined average of deviations change threshold value. If the difference is greater than the predetermined deviation change threshold value, the number of intervals associated with the lowest average deviation of frequencies values of the set being analyzed may be used for the next histogram rebuild. If, however, the difference is lower than the predetermined average of deviations change threshold value, the lowest number of intervals associated with the average of deviations values of the set being analyzed may be used for the next histogram rebuild.

In other examples, if the difference is lower than the predetermined deviation change threshold value, the set of average of deviations values may be further analyzed. The set may be analyzed to identify the average of deviations values that fall within a predetermined distribution. The predetermined distribution may be based the percentage difference between the lowest average of deviations value and the rest of the set. Average of deviations values of the set that fall within a predetermined percentage of the lowest average of deviations value of the set are selected as a subset. The lowest number of intervals associated with the average of deviations values of the subset may be selected for the next rebuild.

In another example, the change in the number of intervals over a predetermined number of histogram rebuilds may be monitored. In one example, if over the course of a predetermined number of histogram rebuilds, a trend in the changes in the number of intervals over the predetermined number of histogram rebuilds may be analyzed. The number of intervals associated with a most-recently generated histogram set may be analyzed over a predetermined number of histogram rebuilds after the newest histogram of the set has been built. If the number of intervals successively increases and then decreases a predetermined number of times over the predetermined number of histogram rebuilds, the lowest number of intervals associated with the most-recently generated histogram set may be used in a subsequent histogram rebuild.

FIG. 5 is a block diagram of a software and/or hardware environment used to rebuild histograms. In one example, an interval selection module 500 may be executed by the database system 100. Each time a histogram is to be rebuilt, the histogram interval selection module 500 may be executed. In one example, the interval selection module 500 may receive a rebuild notification 501 to indicate the rebuild is to occur. This notification 501 may be generated at the access module 110 level. Upon execution of the interval selection module 500, the interval selection module 500 may execute various submodules, such as the histogram reference frequency (HRF) module 502. The HRF module 502 may retrieve histogram reference records 504 for the candidate histogram from the data dictionary 122. The HRF module 502 may also retrieve a predetermined reference threshold value 506 from the database dictionary 122. The predetermined reference threshold value 506 may represent the threshold value at which consideration of increasing the number of intervals of the candidate histogram may be given. If the number of times the candidate histogram has been referenced is less than the threshold value, the HRF module 502 may provide interval reduction instructions 508 to the access modules 110 responsible for rebuilding the histogram. In one example, the instructions 508 may indicate that the number of intervals is to be reduced by one half.

If the number of times the candidate histogram has been referenced exceeds the threshold value based on the number indicated in the records 504, the HRF module 502 may provide histogram rebuild confirmation 510 to the histogram interval determination (HID) module 512. The HID module 512 may be responsible for determining the number of intervals to be used in a rebuild of the candidate histogram. In one example, the new number of intervals may be determined according to Eqn. 2. The HID module 512 may retrieve the average tolerable threshold 514 and current information 516 on the candidate histogram. After the new number of intervals is determined, the new interval number 518 may be provided to the access module(s) 110 building the histogram.

The interval adjustment impact review (IAIR) module 520 may be engaged at predetermined intervals such as after a number of rebuilds of a histogram. The IAIR module 520 may determine if the impact of rebuilding the histogram is providing a desired effect. In one example, the IAIR module 520 may be implemented during the occurrence of predetermined events, such as the occurrence of a predetermined number of histogram rebuilds of a particular histogram. The HID module 516 may indicate through a rebuild notification 522 to the IAIR module 520 each time a histogram is rebuilt. Based on this information, the IAIR module 520 may retrieve historical histogram information 524 for the rebuild histogram from the data dictionary 122. The IAIR module 520 may analyze the historical histogram information 524 for the associated histogram.

The IAIR module 520 may use one or more procedures to determine if adjustment of the number of intervals is appropriate. The IAIR module 520 may analyze a set of stored average of deviations values or a number of intervals from previous histogram rebuilds in the manner previously described. Other suitable types of analysis may be employed alternatively or in addition to those specifically described. If adjustment of the number of intervals is appropriate based on one or more of these analyses techniques, the IAIR module 520 may determine the adjusted interval number 526 and provide it to the access module(s) 110 rebuilding the histogram.

FIG. 6 is an operational flow diagram of histogram rebuilding by the database system 100. In one example, a histogram rebuild may be initiated as a precursor to statistics generation for query response planning (600). In one example, the database system 100 may compare how frequently the histogram to be rebuilt has been previously referenced over a predetermined period of time. This reference frequency may be compared to a predetermined threshold (602). If the reference frequency for the histogram is less than the predetermined threshold, the number of intervals may be reduced (604), such as by one half. In other example, the number of intervals may remain unchanged.

If the reference frequency is greater than the threshold, the database system 100 may determine the average frequency of each current interval of the histogram to be rebuilt (606). Upon determination of the average frequency of each interval, the average frequency of the histogram may be determined (608). Using the average frequency of the histogram, the database system may determine deviation of frequencies of the histogram, such as through the relationship of Eqn. 1 (610). This may include retrieval or determination of statistics regarding the histogram to be rebuilt.

Upon determination of the average of deviations, the database system may determine a new number of intervals to be used, such as through Eqn. 2 (612). This determination may include retrieval of a tolerable average of deviations, as well as the number of intervals currently being used by the histogram. Using the new number of intervals, the histogram may be rebuilt (614). Upon building the new histogram, the database system 100 may determine if review of the impact of the interval number adjustment is appropriate (616). In one example, the review may be triggered after a predetermined number of histogram rebuilds. If review is not triggered, the rebuild process may end until the next initiation.

If the rebuild review is triggered, a rebuild analysis may be performed (618). The rebuild analysis may implement one or more of the techniques previously discussed, such as analyzing predetermined groups of average of deviations or numbers of intervals used in prior rebuilds of the histogram. The database system may determine if interval adjustment is appropriate based on the analysis (620). If database system 100 does not adjust the number of intervals, the rebuild process may end until the next initiation. If adjustment is to occur, adjusted interval number may be selected and used for rebuilding the histogram (622) and then the rebuild process may end.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A database system comprising:
an array of storage devices configured to store a plurality of database tables and a plurality of histograms, wherein each histogram corresponds to at least one column of a database table;
a processor in communication with the storage device, the processor configured to:
receive an indication that a histogram is to be rebuilt, wherein the histogram is defined by a first number of intervals, and wherein column values of at least one column are distributed across the first number of intervals;
determine at least one condition associated with the histogram, wherein the at least one condition is based on the overall distribution of column values across the entire histogram;
in response to the determination of the at least one condition, determine a second number of histogram intervals based on histogram information exclusively associated with the histogram; and
in response to the determination of the second number of histogram intervals, rebuild the histogram, wherein the rebuilt histogram is defined by the second number of intervals.

2. The database system of claim 1, wherein the second number of histogram intervals is greater than the first number of histogram intervals.

3. The database system of claim 1, wherein the at least one condition is an average deviation of frequencies of the histogram.

4. The database system of claim 3, wherein the processor is further configured to:
determine an average frequency of values over the first number of intervals of the histogram; and
determine the average deviation of frequencies based on the average frequency of values of the histogram.

5. The database system of claim 3, wherein the processor is further configured to:
retrieve an average deviation of frequencies limit from one of the storage devices; and
determine the second number of histogram intervals based on the average deviation of frequencies limit.

6. The database system of claim 5, wherein the processor is further configured to determine the second number of intervals according the equation:

$$(ADF/TDF)*IN$$

, wherein ADF is the average deviation of frequencies, TDF is the average of deviation of frequencies limit, and IN is the first number of intervals.

7. The database system of claim 1, wherein the processor is further configured to:
determine a number of times the histogram has been referenced in association with a database query over a predetermined period of time;
compare the number times the histogram has been referenced to a reference threshold value; and
rebuild the histogram using the second number of intervals in response to the number times the histogram has been referenced being greater than the reference threshold value.

8. The database system of claim 7, wherein the processor is further configured to:

reduce the first number of intervals by a predetermined rate in response to the number times the histogram has been referenced being less than the reference threshold value; and rebuild the histogram using the reduced first number of intervals.

9. A method comprising:

determining, with a processor, to rebuild a histogram on at least one column of a database table, wherein the histogram is defined by a first number intervals, and wherein column values of the at least one column are distributed across the first number of intervals;

determining, with the processor, at least one condition associated with the histogram, wherein the at least one condition is based on the overall distribution of column values across the entire histogram;

in response to the determination of the at least one condition, determining, with the processor, a second number of intervals based on histogram information exclusively associated with the histogram; and in response to the determination of the second number of histogram intervals, rebuilding, with the processor, the histogram using the second number of intervals, wherein the rebuilt histogram is defined by the second number of intervals.

10. The method of claim 9, wherein determining, with the processor, the at least one condition associated with the distribution of column values of the at least one column in the histogram comprises determining, with the processor, an average deviation of frequencies of the histogram.

11. The method of claim 10, wherein determining, with the processor, the second number of intervals comprises determining, with the processor, the second number of intervals based on the expression:

$$(ADF/TDF)*IN$$

, wherein ADF is the average deviation of frequencies, TDF is an average of deviation of frequencies limit, and IN is the first number of intervals.

12. The method of claim 10, further comprising:

performing, with the processor, multiple rebuilds of the histogram;

determining, with the processor, a respective number of intervals for the histogram each time a histogram is rebuilt;

storing, with the processor, a respective deviation of frequencies associated with each histogram rebuild;

analyzing, with the processor, a predetermined number of respective deviation of frequencies associated the most-recent histogram rebuilds of the multiple rebuilds;

determining, with the processor, a difference between a highest deviation of frequencies of the predetermined number and a lowest deviation of frequencies of the predetermined number;

performing, with the processor, a rebuild of the histogram using a number of intervals associated with the lowest deviation of frequencies of the predetermined number in response to the difference being less than a predetermined threshold value.

13. The method of claim 9, further comprising:

determining, with the processor, a number of times the histogram has been referenced in association with a database query over a predetermined period of time;

comparing, with the processor, the number times the histogram has been referenced to a reference threshold value; and rebuilding, with the processor, the histogram using the second number of intervals in response to the number times the histogram has been referenced being greater than the reference threshold value.

14. The method of claim 13, further comprising:

reducing, with the processor, the first number of intervals by a predetermined rate in response to the number times the histogram has been referenced being less than the reference threshold value; and rebuilding, with the processor, the histogram using the reduced first number of intervals in response to the number times the histogram has been referenced being less than the reference threshold value.

15. The method of claim 9, further comprising:

performing, with the processor, a rebuild of the histogram each time an associated database query;

determining, with the processor, a respective number of intervals each time a histogram is rebuilt;

storing, with the processor, the respective numbers of intervals;

determining, with the processor, a trend associated with changes in a predetermined number of successive respective numbers of intervals;

comparing, with the processor, a predetermined profile to the trend; and performing, with the processor, a rebuild of the histogram using a number of intervals from the predetermined number of successive respective numbers of intervals in response to comparison of the profile to the trend.

16. A non-transitory computer-readable medium encoded with a plurality of instructions executable by a processor, the plurality of instructions comprising:

instructions to rebuild a histogram associated with at least one column of a database table, wherein the histogram is defined by a first number of histogram intervals;

instructions to determine at least one condition associated with the histogram, wherein the at least one condition is based on the overall distribution of column values across the entire histogram;

in response to the determination of the at least one condition, instructions to determine a second number of histogram intervals based on histogram information exclusively associated with the histogram; and in response to the determination of the second number of histogram intervals, instructions to rebuild the histogram using the second number of histogram intervals, wherein the rebuilt histogram is defined by the second number of intervals.

17. The non-transitory computer-readable medium of claim 16, wherein the instructions to rebuild the histogram using the second number of histogram intervals comprise instructions to rebuild the histogram using the second number of histogram intervals, wherein the second number of histogram intervals is greater than the first number of histogram intervals.

18. The non-transitory computer-readable medium of claim 16, wherein the instructions to determine at least one condition associated with a distribution of column values of the at least one column in the histogram comprise instructions to determine an average deviation of frequencies of the histogram.

19. The non-transitory computer-readable medium of claim 18, wherein the plurality of instructions further comprise:

instructions to determine an average frequency of values over the first number of intervals of the histogram; and instructions to determine the average deviation of frequencies based on the average frequency of values of the histogram.

20. The non-transitory computer-readable medium of claim 18, wherein the plurality of instructions further comprise instructions to receive an average deviation of frequencies limit from one of the storage devices, wherein the instructions to determine the average deviation of frequencies comprise instructions to determine the second number of histogram intervals based on the average deviation of frequencies limit.

* * * * *